United States Patent
Mawbey et al.

(10) Patent No.: US 7,048,336 B2
(45) Date of Patent: May 23, 2006

(54) NECK REST FOR THE SEAT OF AN AUTOMOBILE

(75) Inventors: Gerald Mawbey, Idstein (DE); Gerd Fischer, Weikersheim (DE); Roland Och, Rottendorf (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 0 days.

(21) Appl. No.: 10/889,033

(22) Filed: Jul. 13, 2004

(65) Prior Publication Data

US 2005/0046262 A1    Mar. 3, 2005

(30) Foreign Application Priority Data

Aug. 1, 2003    (DE) ................. 103 35 268

(51) Int. Cl.
   *A47C 7/36* (2006.01)
(52) U.S. Cl. ...................... 297/408; 297/410
(58) Field of Classification Search ............... 297/408, 297/410
   See application file for complete search history.

(56) References Cited

U.S. PATENT DOCUMENTS

| | | | |
|---|---|---|---|
| 4,278,391 A | | 7/1981 | Dagenais |
| 5,664,841 A | * | 9/1997 | Dal Monte ............... 297/408 |
| 5,904,405 A | | 5/1999 | Wu |
| 6,062,643 A | | 5/2000 | Schroten et al. |
| 6,082,817 A | | 7/2000 | Muller |
| 6,149,231 A | | 11/2000 | Wustholz |
| 6,158,812 A | | 12/2000 | Bonke |
| 6,213,548 B1 | | 4/2001 | Van Wynsberghe et al. |
| 6,513,871 B1 | | 2/2003 | Bartels |
| 6,666,516 B1 | * | 12/2003 | Grammss et al. ....... 297/408 X |
| 6,688,697 B1 | * | 2/2004 | Baumann et al. ........... 297/391 |
| 6,805,411 B1 | * | 10/2004 | Gramss et al. ........... 297/408 X |

FOREIGN PATENT DOCUMENTS

| | | |
|---|---|---|
| DE | 3347255 | 7/1985 |
| DE | 3404612 | 8/1985 |
| DE | 3900495 | 7/1990 |
| DE | 29603991 | 7/1996 |
| DE | 19707998 | 9/1998 |
| DE | 29808982 | 9/1998 |
| DE | 199 51 966 A1 | 5/2001 |
| DE | 199 61 617 A1 | 7/2001 |
| DE | 10030549 | 1/2002 |
| DE | 101 42 625 A1 | 4/2003 |
| DE | 102 08 620 C1 | 7/2003 |
| GB | 2037154 | 7/1980 |
| GB | 2363323 | 12/2001 |

* cited by examiner

*Primary Examiner*—Anthony D. Barfield
(74) *Attorney, Agent, or Firm*—Lowe Hauptman & Berner, LLP

(57) ABSTRACT

A neck rest includes first and second supports having first and second positions where the supports are at approximately the same level and the second support is elevated relative to the first support, respectively. A first spring is supported by the first support and rotatably connected to the second support to bias the second support into the second position. A movable locking element biased by a second spring on the first support automatically blocks the second support in the second position. A locking element is movably supported by the first support and cooperates with a projection of the second support to lock the second support in the first position. A releasing element is movably supported by the first support and releases the locking element when actuated. A supporting member is located between the supports in the second position for transferring shock forces from the second support to the first support.

20 Claims, 4 Drawing Sheets

NECK REST FOR THE SEAT OF AN AUTOMOBILE

RELATED APPLICATIONS

The present application is based on, and claims priority from, German Application Number 103 35 268.6, filed Aug. 1, 2003, the disclosure of which is hereby incorporated by reference herein in its entirety.

FIELD OF THE INVENTION

The invention relates to a neck rest for the seat of an automobile.

BACKGROUND OF THE INVENTION

DE 199 61 617 A1, DE 199 51 966 A1 or DE 101 42 625 A1 have made known a neck rest which has a supporting member adapted to be advanced to the front on the head of the seat used, and a shock member which actuates it. When there is an impact onto the rear end of the vehicle the shock member is actuated and the supporting member is advanced to the front. The supporting member is mounted on the upholstering carrier via pivoting arms. In DE 199 51 966 A1, the supporting member forms part of the neck rest upholstering which is composed of two components which are interconnected via joints. The shock member can interact with the supporting member via a pulling cable and be in communication with a releasing element.

DE 102 08 620 describes a neck rest for automobile seats which has a fixed support portion as well as a second support portion for a movable upholstering portion which is movably supported by the first support portion. The second support portion is pivotally supported about a lower horizontal axis on the first support portion and an actuation device is formed by a spring which biases the second support portion. A controllable locking device retains the second support portion in the retracted position on the first support portion. A third support portion is slidably mounted on the second support portion between a lower and an upper position. The third support portion is biased to the upper position by means of a second spring. A controllable second locking device retains the third support portion in the lower position with second locking device being unlocked once the second support portion has reached a predetermined pivoting angle. Further, stop means are provided between the second and third support portions and the first support portion when the second and third support portions have arrived at their extracted positions, to prevent the latter from pivoting back. The structure described last is intended to achieve an optimum absorption of force with the sitting person not undergoing a risk of injury when there is a rear-end shock.

SUMMARY OF THE INVENTION

It is the object of the invention to provide a divided neck rest in which simple means take care that if there is an impact against the automobile and an abrupt acceleration the head of the sitting person can be efficiently cushioned against an advanced and raised portion of the neck rest.

Like in the state of the art, the neck rest is also divided into a first and a second support portion in the invention, the first one being mounted on the seat by means of neck rest rods and the second one constituting the movable one. The first support portion mounts a first spring which has at least one leg which is rotationally supported by the second support portion and biases it away from the first support portion. The second support portion has a guiding element which is guided by a guideway of the first support portion in displacing the second support portion from the first position to the second one, and vice versa. A movable locking element biased by a second spring on the first support portion automatically blocks the second support portion in its second position. A locking element is supported by the first support portion and is adapted to be moved between a locking and an unlocking position. In the locking position, it cooperates with a locking projection of the first support portion to lock the second support portion in the first position. A releasing element movably supported by the first support portion, when in a non-actuated position, blocks the locking element in the locking position. An actuation device acts on the releasing element to unlock the locking element when the releasing element is actuated.

In the inventive neck rest, the cooperation between the guiding element and guideway and the displacement path of the spring leg of the first spring determine the path of the second support portion during the displacement from the first position to the second one, and vice versa. The leg of the first spring firstly constitutes the actuator for the second support element and secondly forms a mounting for the second support portion in the second position thereof, in which second position supporting means are provided via which an impact onto the upholstering part of the second support portion is cushioned.

The components required for the displacement of the second support portion and its locking and supporting can be configured as being very simple and be assembled to be very compact. The releasing element can be selectively actuated in an electric or electromagnetic manner or via a pulling cable (Bowden wire), it being left open because of which physical event to release the releasing element. Thus, for example, a sensor responding to an acceleration is imaginable which causes a release of the neck rest once the acceleration rate exceeds a certain amount.

According to an aspect of the invention, a locking arm is disposed on that side of the second support portion which faces the first support portion. It interacts with a counter bearing in the upper part of the first support portion. According to an aspect of the invention, the counter bearing can have a deepening which is engaged by the end of the locking arm.

According to another aspect of the invention, the guiding element can be formed by a rod or pin or the like which are guided by parallel spaced guiding slots of the first support portion.

The locking element can be a blocking plate which is biased by the second spring into the blocking position where the rod or the pins interact with a blocking shoulder of the blocking plate when the guiding rod or when the guiding pins are displaced into the second position upon movement of the second support portion.

According to another aspect of the invention, the locking arm extending approximately horizontally, on the second support portion, can have a downwardly facing extension which engages an upwardly open locking recess of the locking plate which, in turn, is pivotally supported about a horizontal axis on the first support portion. It is understood that the extension and recess can also be interchanged, i.e. the locking arm can have a recess and the locking plate a relative extension which lockingly engages the recess.

The releasing element maintains the locking element in the locking position and is freed of the blocking element during a motion out of the blocking position. The releasing element can be linearly movable and be biased by a spring into the blocking position. The releasing element can be adapted to be actuated by an electromagnet, for example.

BRIEF DESCRIPTION OF THE DRAWING

An embodiment of the invention will now be described in more detail below with reference to the drawings.

DETAILED DESCRIPTION OF THE INVENTION

Figure 2:
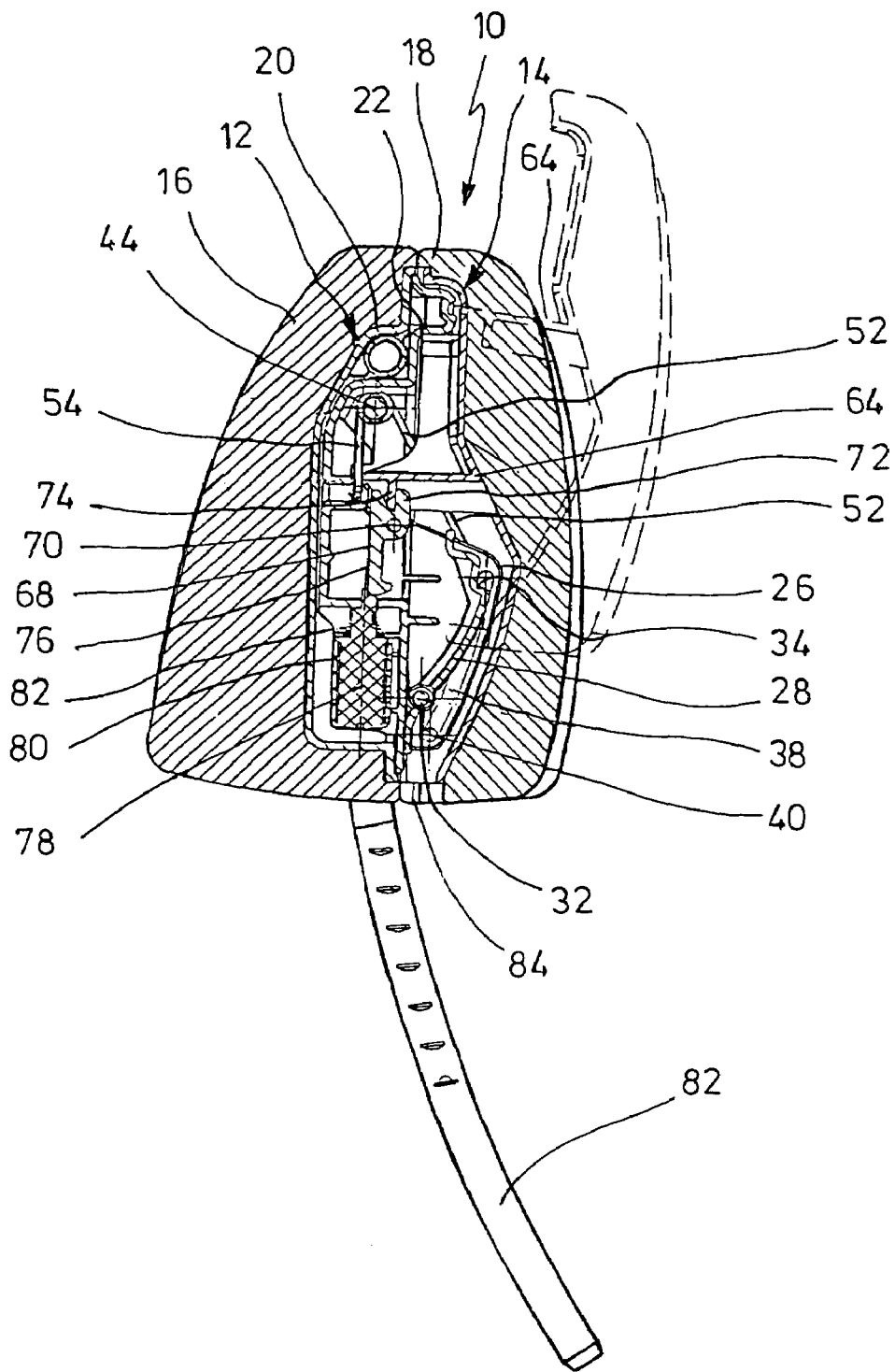
FIG. 2 shows a section through the neck rest of FIG. 1 taken along the line 2—2.

A neck rest 10 for the back rest of a seat, which is not shown in detail, of an automobile has a first support portion 12 and a second support portion 14. An upholstering 16 for the support portion 12 and an upholstering 18 for the support portion 14 are shown in FIG. 2. The upholstering is omitted in the remaining Figures for reasons of representation.

The support portion 12 will initially be described in more detail below. As ensues from FIGS. 2 to 4 it is composed of two plate shaped portions 20 and 22 which are manufactured from a plastic and are interleaved with each other as is specifically apparent from FIG. 2. The two portions 20, 22 define recesses or spaces to receive components yet to be described.

Figure 3:
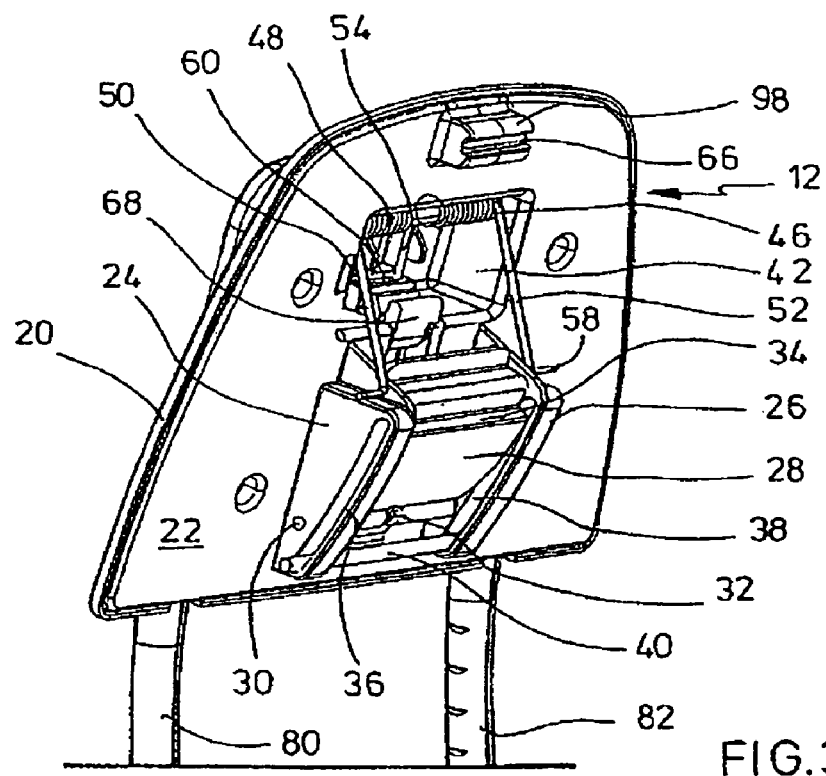
FIG. 3 shows a perspective view of the first support portion of the neck rest of FIGS. 1 and 2 from the front with the second support portion, which is not shown, in a non-actuated condition.
Figure 4:
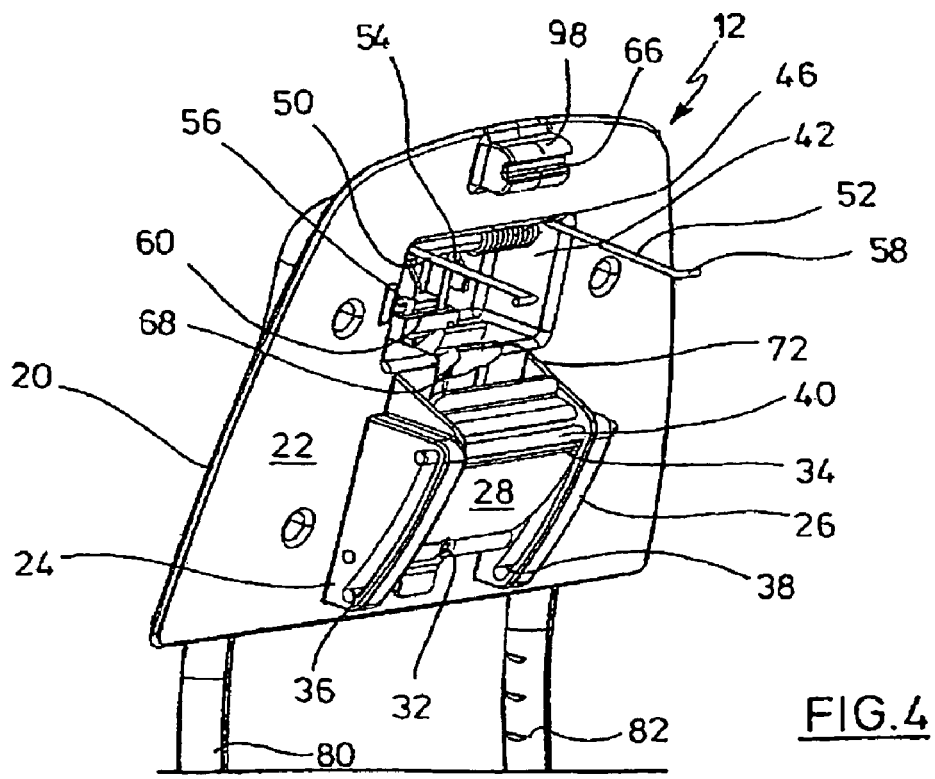
FIG. 4 shows a view similar to that of FIG. 3, but with the second support portion actuated, though not shown in the drawing.

As ensues from FIGS. 3 and 4, two parallel cheeks 24, 26 disposed at a spacing from each other are formed at the front of the portion 22. The cheeks 24, 26 have pivotally supported therebetween a blocking plate 28 about an axis 30. It is outwardly biased by a spring 32. The blocking plate 28 has a blocking shoulder 34 in the upper area. The spring 32 biases the blocking plate 28 outwardly. The cheeks 24, 26 have a slightly curved guiding slot 36, 38 each which obliquely extends upwards and in which a rod 40 is guided. The rod 40 is in the lower area of the slots 36, 38 in FIG. 3 and is in the upper end of the slots 36, 38 in FIG. 4.

Figure 5:
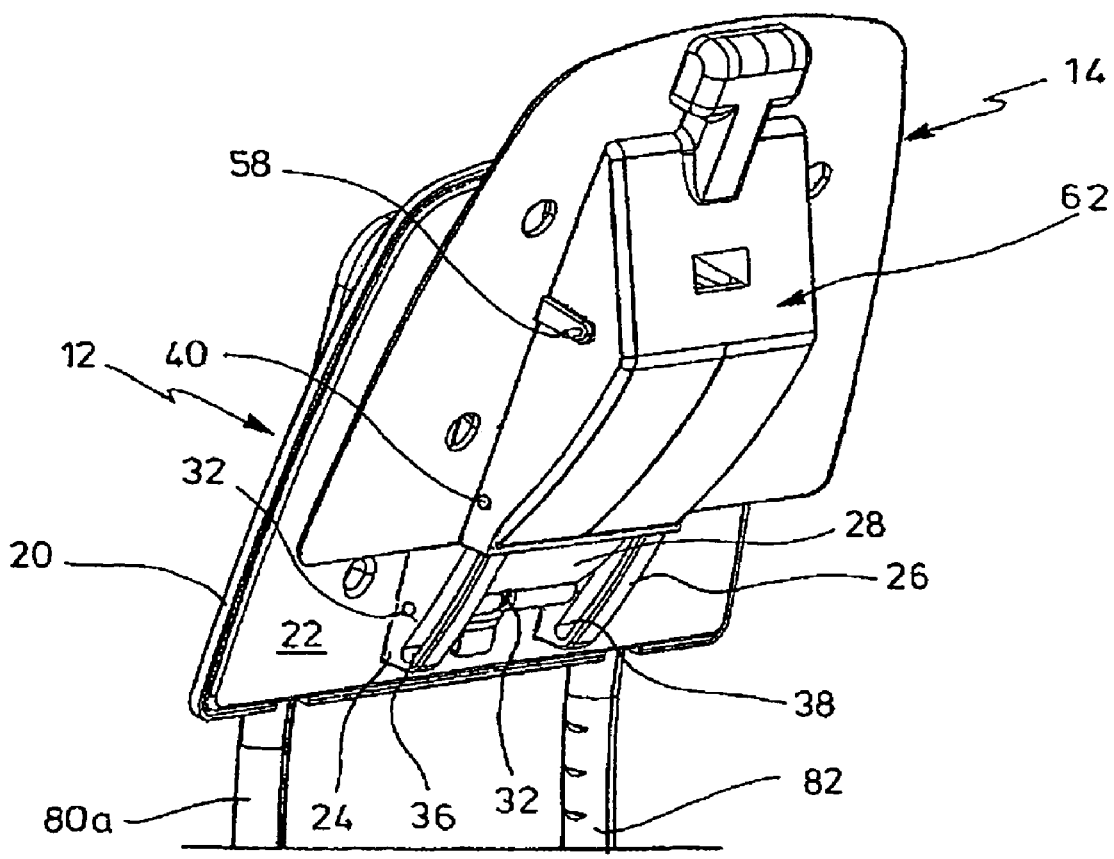
FIG. 5 shows a perspective view of the neck rest of FIGS. 1 and 2 with the second support portion in an actuated condition.

A recess 42 has supported therein two legged springs 46, 48 side by side on a rod-like bearing 44. Each of them has a first leg 50 and 52 and a second leg 54, 56 at their outer ends. Both of the long legs 50, 52 are provided with a bent-away portion 58 at the end. The legs 54, 56 are fixed in place in a recess 60 of the portions 22 as they engage the recess 60 from above. In contrast, the legs 50, 52 are pivotable. The bent-away portions 58 engage respective holes of the second support portion 14 as can be seen from FIG. 5. The holes are formed in a hood-like portion 62 at the front of the second support portion 14 on the lateral walls. Only one portion 58 is shown in a hole of the hood-like portion 62 in FIG. 5. The legged springs 48, 50 are configured such as to bias the second support portion 14 into the upwardly and laterally extracted position as is shown in FIG. 5 and in phantom lines in FIG. 2. The limitation in the position of the second support portion 14 in FIGS. 2 and 5 is achieved by the fact that the rod 40 also extends into holes of the hood-like portion 62, which are not shown in detail, and is moved along together with the motion of the second support portion 14, as a result. Thus, in the position shown in FIG. 5 for the second support portion 14, the rod 40 abuts against the upper end of the guiding slots 36, 38.

When the second support portion 14 is in the second position shown in FIG. 5 the rod 40 is adjacent to the blocking shoulder 34 of the blocking plate 28. Therefore, a force acting downwardly onto the second support portion 14 does not cause a displacement of the second support portion 14.

An arm 64 is formed to the rear of the second support portion 14. As is shown in the extracted second position of FIG. 5 and in phantom lines in FIG. 2 the free end of the arm 64 engages a horizontal deepening 66 of an extension 98 at the front of the first support portion 12 in the upper region as can be clearly seen in FIGS. 3 and 4. This gives the second support portion 14 a horizontal support on the first support portion 12 when a force acts horizontally onto the second support portion 14 towards the first support portion 12.

A locking element 68 is pivotally supported horizontally about an axis 70 on the portion 22 of the first support portion 12. The locking element 68 is forked at 72 in the upper region and a downwardly projecting extension 74 of the supporting arm 64 engages the forked portion 72 in the first position of the second support portion 14 of FIG. 2. The downwardly facing portion 76 of the locking element abuts against the protrusion of an armature 78 of an electromagnet 80. The armature 78 is upwardly biased by a spring 82. This prevents the locking element 68 from pivoting and the second support portion 14 is held in place in the position illustrated in FIG. 2 although the legged springs 48, 46 are biased.

It should also be mentioned that the first support portion 12 has two neck rest rods 80, 82 which extend downwardly and in parallel at a spacing from each other and can be received in appropriate seats of the back rest of the automobile seat which are not shown. In FIG. 2, it can be seen that the rods 80, 82 are concavely bent as viewed from the bottom. Further, it should be mentioned that the upholstering 18 for the second support portion 14 leaves an opening 84 in the lower region to introduce a tool for pivoting the blocking plate 28 counterclockwise to allow the support portion 14 to be moved back again from the position shown in FIG. 5 to the position shown in FIG. 2. This is because pivoting the blocking plate 28 will release the rod 40, thus permitting the support portion 14 to be shifted downwardly against the force of the legged springs 46, 48. The blocking plate 28 can also be pivoted by hand when the second support portion 14 has been extracted as shown in FIG. 5. Then, the blocking plate 28 will be freely accessible in its lower region.

Figure 1:
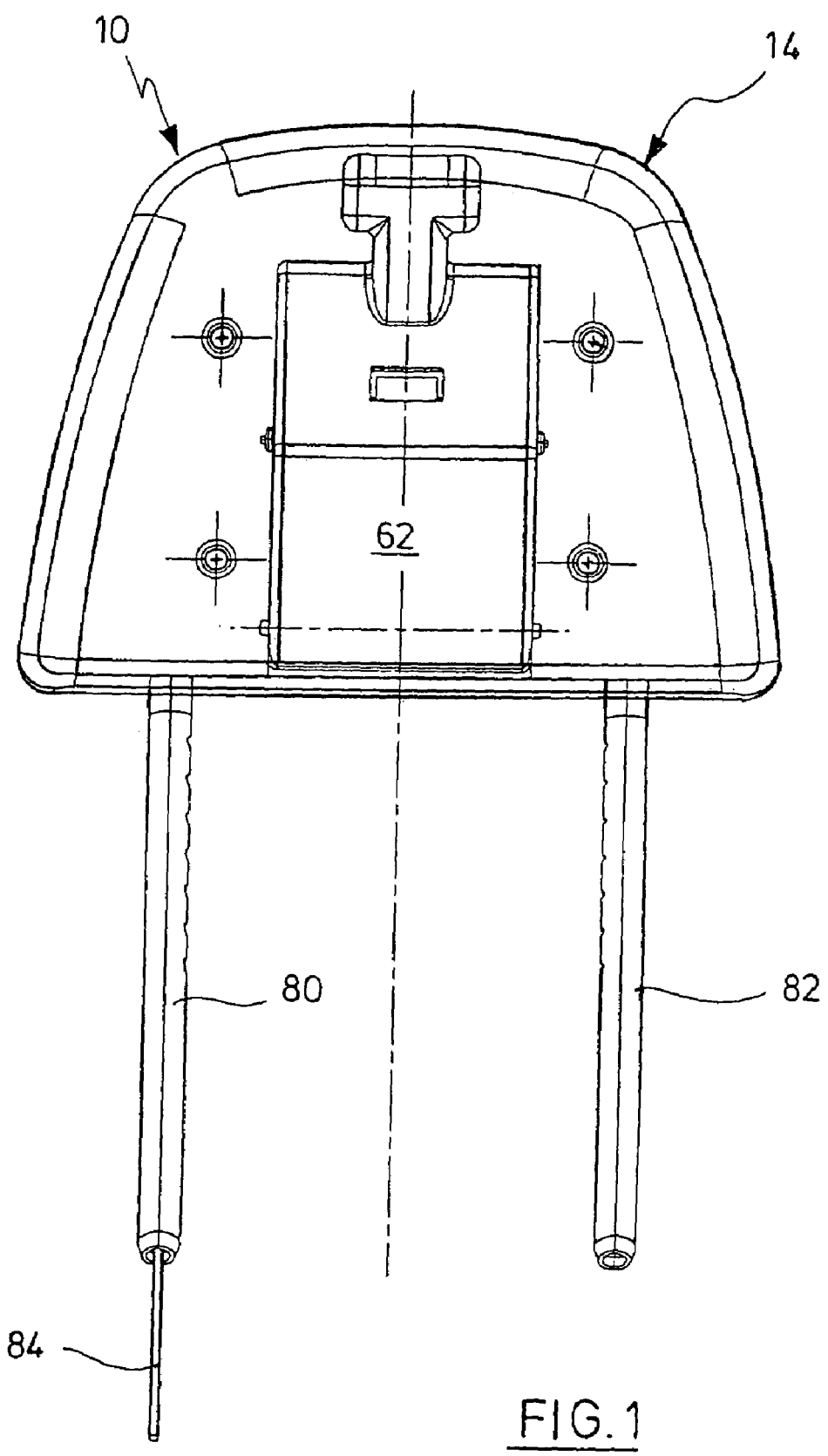
FIG. 1 shows a front view of the inventive neck rest with no upholstering component.

What can be recognized from FIG. 1 is that the neck rest rods 80, 82 are hollow and the rod 80 has passed therethrough a cable 84 which is led to the electromagnet 80 in order to activate it. The source which causes an activation of the electromagnet 80 is not shown. In an activation case, the armature 78 of the electromagnet 80 is moved downwards, thereby releasing the locking element 68. This enables the supporting arm 64 to pivot the locking element 68 by the extension 74 about the pivot pin 70 in a clockwise sense. This unblocks the looking device for the second support portion 14 and the second support portion is now pivoted forwards and upwards by means of the legs 52, 50 of the legged springs 46, 48 as is outlined in FIG. 5 and is also shown in phantom lines in FIG. 2. Guidance during the displacement of the support portion 14 is performed via the rod 40 within the guiding slots 36. 38 until they abut against the upper end of the guiding slots. While the rod 40 moves in the guiding slots 36, 38 the blocking plate 28, which is bent to the front in a slightly convex manner, is pivoted rearwards against the first support portion 12 against the spring 32 until the rod 40 grips behind the blocking shoulder 34. In this position of the second support portion 14, the supporting aim 64 has arrived at the extension 98 and the free end of the supporting arm 64 engages the transversely extending deepening 66 as is depicted in phantom lines in FIG. 2. In this manner, the location of the second support portion with the upholstering 18 is fixed in the extracted second position and forces which act onto the second support portion 14 and substantially are horizontal are transferred to the counter bearing 98 from the supporting arm 64, on one hand, and to the guiding slots 36,38 from the rod 40, on the other.

In order to displace the support portion 14 back to the initial position from the second position, an object is introduced through the opening 84 of FIG. 2 by which the blocking plate 28 can be pivoted counterclockwise to cause the blocking shoulder 34 to release the rod 40. It will now be possible, by manual downward pressure, to move the second support portion 14 back to the position shown in FIG. 2 with the rod 40 being moved along the guiding slot 36, 38 up to a lower stop. At this stage, the extension 74 of the supporting arm 64 engages the forked portion 72 of the locking element 68. This locks the second support portion 14 on the first support portion 12.

Instead of an electromagnet as is shown in FIG. 2, a releasing element can be used which acts in a way similar to the armature 78, but is actuated by a pulling cable, for example.

The invention claimed is:

1. A neck rest for a seat of a vehicle, said neck rest comprising:
   a first support adapted to be supported by a backrest of the seat;
   a second support moveable relative to said first support between a first position where the second support is situated at approximately the same level as the first support, and a second position where the second support is elevated and situated forward of the first support;
   a biasing element biasing the second support toward the second position;
   first and second guiding elements on the first and second supports, respectively, for guiding the second support during movement between the first position and the second position;
   first and second locking mechanisms for locking said second support against movement when said second support is in the first and second positions, respectively; and
   a moveable releasing element for unlocking, when actuated, the first locking mechanism and, hence, releasing the second support from the first position;
   wherein
   said first locking mechanism comprises a locking arm on the second support;
   said first support comprises a receiving portion engageable with said locking arm when said second support is in the second position; and
   said locking arm, when engaged with said receiving portion in the second position of the second support, defines a supporting element between the first and second supports for transfer of shock forces from the second support to the first support.

2. The neck rest of claim 1, wherein the receiving portion comprises a seat engageable with a free end of the locking arm in the second position of the second support.

3. The neck rest of claim 1, wherein the first guiding element comprises a rod which is guided by two parallel spaced guiding slots that define the second guiding element.

4. The neck rest of claim 3, wherein said second locking mechanism comprises a blocking element biased into a path of said rod and engageable with said rod at an upper end of said path to lock said rod at said upper end and said second support in the second position.

5. The neck rest of claim 1, wherein said first locking mechanism further comprises a locking element which is pivotally supported by the first support, said locking element comprising a locking recess engageable with the locking arm when said second support is in the first position.

6. The neck rest of claim 5, wherein the releasing element is movably supported by the first support between a releasing position and a locking position and, in the locking position, locks the locking element against rotation and disengagement with said locking arm.

7. The neck rest of claim 6, further comprising a spring biasing the releasing element into the locking position.

8. The neck rest of claim 1, further comprising an electromagnet for actuating the releasing element.

9. The neck rest of claim 1, wherein said biasing element comprises a spring having first and second legs engaging the first and second supports, respectively;
   the second leg of the spring having an end being rotatably received in a recess of the second support.

10. The neck rest of claim 4, wherein said blocking element is a plate rotatably supported by said first support and biased by a spring into the path of said rod so that said plate is moved away from said path by said rod when said rod is in a middle position on said path;
    said plate spring back into said path to engage said rod from below when said rod is at the upper end of said path.

11. A neck rest for a seat of a vehicle, said neck rest comprising:
    a first support adapted to be supported by a backrest of the seat;
    a second support moveable relative to said first support between a first position where the second support is situated at approximately the same level as the first support, and a second position where the second support is elevated and situated forward of the first support;
    a biasing element biasing the second support toward the second position;
    first and second guiding elements on the first and second supports, respectively, for guiding the second support during movement between the first position and the second position;
    first and second locking mechanisms for locking said second support against movement when said second support is in the first and second positions, respectively;
    a releasing element movably supported by the first support for unlocking, when actuated, the first locking mechanism and, hence, releasing the second support from the first position; and
    an electromagnet for actuating the releasing element.

12. The neck rest of claim 11, wherein said first locking mechanism comprises a locking element pivotally supported by the first support and a locking arm on the second support; said locking element comprising a locking recess engageable with the locking arm when said second support is in the first position.

13. The neck rest of claim 12, wherein the releasing element is movable between a releasing position and a locking position in the first support and, in the locking position, locks the locking element against rotation and disengagement with said locking arm.

14. The neck rest of claim 13, further comprising a spring biasing the releasing element into the locking position.

15. A neck rest for a seat of a vehicle, said neck rest comprising:
- a first support adapted to be supported by a backrest of the seat;
- a second support moveable relative to said first support between a first position where the second support is situated at approximately the same level as the first support, and a second position where the second support is elevated and situated forward of the first support;
- a biasing element biasing the second support toward the second position;
- first and second locking mechanisms for locking said second support against movement when said second support is in the first and second positions, respectively; and
- a releasing element movably supported by the first support for unlocking, when actuated, the first locking mechanism and, hence, releasing the second support from the first position;
- wherein said first and second supports are moveably connected to each other by a rod having opposite end portions received in holes formed in the first and second supports;
- at least one of said holes being elongated, allowing said rod to slide therein, and guiding the second support during movement between the first position and the second position.

16. The neck rest of claim 15, wherein said second locking mechanism comprises a blocking element biased into a path of said rod and engageable with said rod at an upper end of said path to lock said rod at said upper end and said second support in the second position.

17. The neck rest of claim 16, wherein said blocking element is a plate rotatably supported by said first support and biased by a spring into the path of said rod so that said plate is moved away from said path by said rod when said rod is in a middle position on said path;
said plate spring back into said path to engage said rod from below when said rod is at the upper end of said path.

18. The neck rest of claim 16, wherein the first support, on a side facing the second support, has two parallel spaced extensions each including one said elongated hole in along which said rod is slidable;
said extensions rotatably supporting said blocking element.

19. The neck rest of claim 15, wherein said first and second supports are moveably connected to each other further by said biasing element which comprises a spring having first and second legs engaging the first and second supports, respectively, and a middle portion supported by the first support;
the second leg of the spring having an end being rotatably received in a recess of the second support.

20. The neck rest of claim 19, wherein said middle portion is a coil spring.

* * * * *